Aug. 7, 1923.
F. C. GRISWOLD
FILM SCRAPER
Filed Feb. 3, 1922
1,464,264
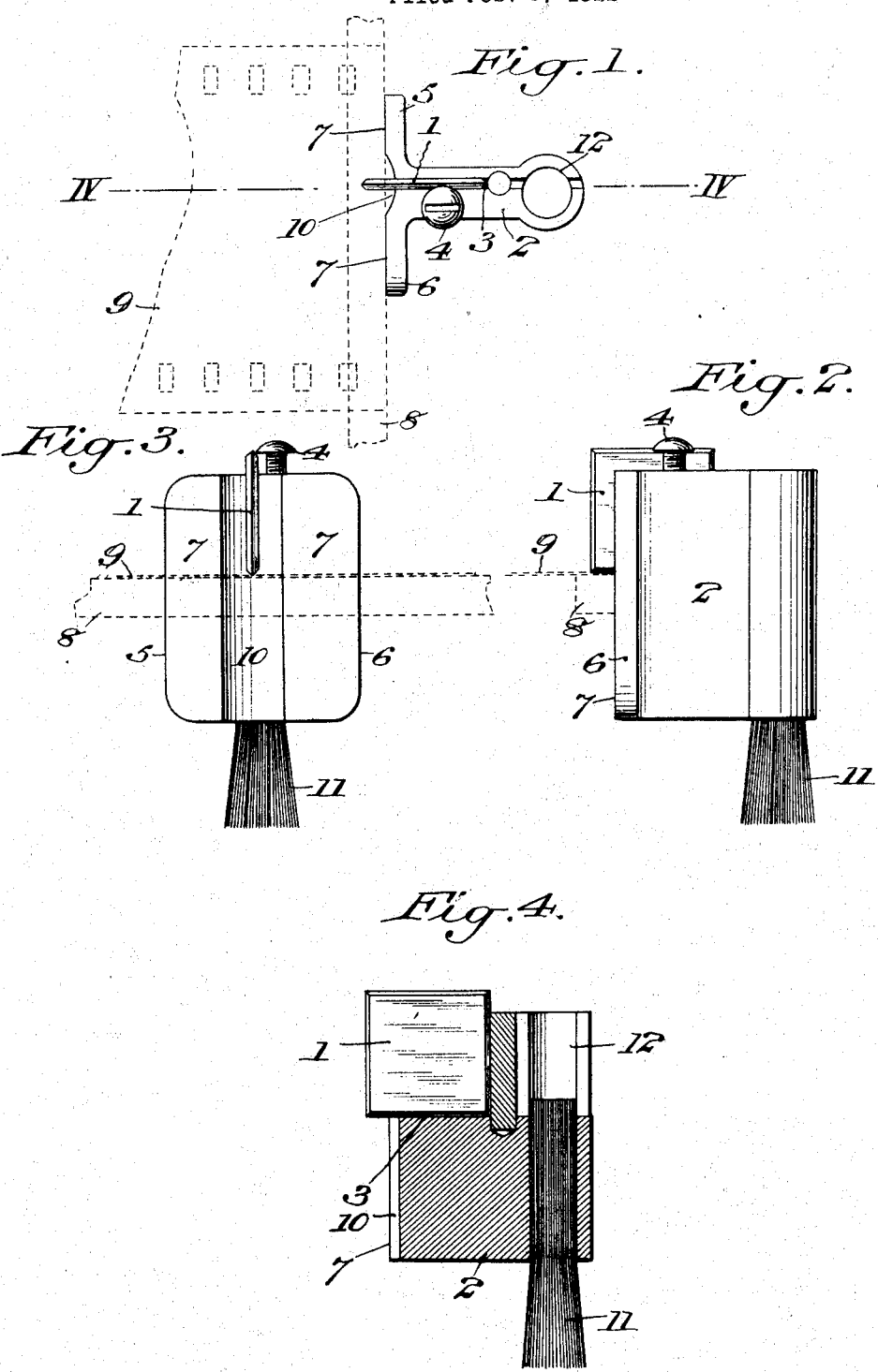
Inventor:-
Fredrick Clark Griswold
by attorneys Patented Aug. 7, 1923.

1,464,264

UNITED STATES PATENT OFFICE.

FREDERICK CLARK GRISWOLD, OF PORT JEFFERSON, NEW YORK, ASSIGNOR TO OLIVE A. GRISWOLD, OF PORT JEFFERSON, NEW YORK.

FILM SCRAPER.

Application filed February 3, 1922. Serial No. 533,987.

*To all whom it may concern:*

Be it known that I, FREDERICK CLARK GRISWOLD, a citizen of the United States, and resident of Port Jefferson, in the county of Suffolk and State of New York, have invented a new and useful Improvement in Film Scrapers, of which the following is a specification.

In splicing films, the emulsion on the surface of one film end which contacts with the overlapping surface of the other film end must be carefully and thoroughly removed before applying the cement. One way of removing the emulsion is by scraping off the same while the film end is resting, emulsion side up on a hard surface, such as the flat top of one of the cutting blades of a film splicer. The knives for doing this work become dull and useless very quickly and also unless they are held in proper position with respect to the film, are liable to cut the film or remove the emulsion unevenly therefrom.

The object of my invention is to produce a film scraper in which the blade has a plurality of scraping edges, any one of which may be quickly brought into operative position as another becomes too dull for effective action; means being provided for coaction with the film support to accurately position the operating edge of the scraper blade with respect to its work, and thus not only ensure the perfect removal of the emulsion from the film, but also eliminate any tendency to injure or cut the same.

A practical embodiment of my invention is represented in the accompanying drawings, in which—

Fig. 1 represents the film scraper in top plan, on an enlarged scale.

Fig. 2 represents the same in side elevation.

Fig. 3 represents a front view of the film scraper.

Fig. 4 represents a section taken in the plane of the line IV—IV of Fig. 1.

The scraper blade 1 is herein shown as rectangular having its periphery developed into eight scraping edge portions, two adjacent each corner, which edge portions are herein shown as being sharpened by beveling both faces of the blade entirely around its periphery.

The holder in which the blade is removably positioned is denoted by 2 and it is provided with a squared slot 3 through its front and top, into which slot the blade 1 is inserted, leaving a portion of the blade projecting beyond the front and top of the holder. The blade 1 is secured in its adjusted position in the holder by providing a set screw 4, the head of which impinges against the upper edge of the blade. The holder 2 is provided with lateral extensions 5 and 6 providing an extended surface for positioning the operating edge portion of the scraper blade with respect to its work. For instance the surface 7 may be pressed against the side of the cutting blade 8 of a film splicer so as to bring the operating edge portion of the scraper squarely onto the end of the film 9, which rests upon the flat top of the cutting blade 8, thus properly positioning the operating edge portion with respect to the film surface. The emulsion may be readily scraped from the film by reciprocating the scraper with its surface 7 pressed against the side of the blade 8 of the film splicer. The front of the holder 2 may be provided with a vertical groove 10, into which the squared slot 3 opens.

As soon as one operating edge portion of the scraper blade 1 has become dulled and inefficient, the head of the screw 4 may be released from its engagement with the blade and the blade may be removed from the holder and again inserted into the holder with its position changed to bring another operating edge portion into scraping position. The screw may then be engaged with the blade to secure it in its new operating position. It will be seen that there are two scraping edge portions adjacent each corner of the blade and by turning and reversing the blade, all eight of the scraping edge portions may be brought into operative position with respect to the work.

The holder for the scraper blade may be provided with a brush 11 for removing foreign matter from the scraped face of the film. In the present instance the holder is shown as having a vertical socket 12 therethrough into which the shank of the brush 11 is inserted and there secured by cement or otherwise.

It is intended that the size of the blade 1 and the depth of the slot 3 should be so proportioned that the required amount of the operating edge portion of the scraper blade will project beyond the front of the holder at right angles to the positioning surface of the holder, the distance back from the end of the film it is desired to remove the emulsion therefrom.

It is evident that various changes may be resorted to in the construction, form and arrangement of the several parts of the scraper without departing from the spirit and scope of my invention; hence, I do not wish to limit myself to the particular embodiment herein shown and described, but

What I claim is:—

1. A film scraper including a reversible rectangular blade having its periphery developed into eight scraping edge portions, two adjacent each corner, a holder for the blade, and means for securing the blade in the holder with a predetermined scraping edge portion in its operative position with respect to the front of the holder.

2. A film scraper including a reversible rectangular blade having its periphery developed into eight scraping edge portions, two adjacent each corner, a holder for the blade, and means for securing the blade in the holder with a predetermined scraping edge portion in its operative position with respect to the front of the holder, the front of the said holder having extended surfaces located at both sides of the blade for positioning the operating edge portion with respect to its work.

3. A film scraper including a reversible rectangular blade having its periphery developed into eight scraping edge portions, two adjacent each corner, a holder having a squared slot opening through its front and top for receiving said blade and holding it with a predetermined scraping edge portion projecting beyond the front of the holder at right angles thereto.

4. A film scraper including a reversible rectangular blade having its periphery developed into eight scraping edge portions, two adjacent each corner, a holder having a squared slot opening through its front and top for receiving said blade and holding it with a predetermined scraping edge portion projecting beyond the front of the holder at right angles thereto, said holder being provided with lateral extensions upon opposite sides of the blade to provide extended surfaces for positioning the operating edge portion with respect to its work.

In testimony that I claim the foregoing as my invention, I have signed my name this 28th day of January, 1922.

FREDERICK CLARK GRISWOLD.